United States Patent [19]

Goodyear

[11] Patent Number: 5,542,335
[45] Date of Patent: Aug. 6, 1996

[54] HYDRAULIC ASSIST PROPULSION APPARATUS FOR VEHICLE DRIVE

[76] Inventor: Richard G. Goodyear, 912 S. Depot St., Bonifay, Fla. 32425-2910

[21] Appl. No.: 337,970

[22] Filed: Nov. 14, 1994

[51] Int. Cl.[6] .............................. F01B 13/00; F04B 17/00
[52] U.S. Cl. .................... 91/61; 92/136; 417/415; 180/305
[58] Field of Search .................... 60/325, 368; 91/55, 91/61; 92/136; 180/305, 307; 417/415

[56] References Cited

U.S. PATENT DOCUMENTS

| | | |
|---|---|---|
| 465,100 | 12/1891 | Rice, Jr. . |
| 583,802 | 6/1897 | Hartwig . |
| 617,782 | 1/1899 | McCollum . |
| 771,864 | 10/1904 | Eager ........................................ 14/127 |
| 783,111 | 2/1905 | Eager . |
| 1,024,379 | 4/1912 | Tosco, et al. . |
| 1,369,256 | 2/1921 | Mackle . |
| 1,699,687 | 1/1929 | Conterio . |
| 2,309,637 | 2/1943 | Fickett et al. ............................ 91/61 X |
| 3,026,850 | 3/1962 | Clifton et al. ............................ 91/61 X |
| 3,205,965 | 7/1962 | Roth . |
| 3,369,360 | 2/1968 | Biasi ..................................... 180/307 X |
| 4,413,698 | 11/1983 | Conrad, et al. ........................... 180/305 |
| 4,462,345 | 7/1984 | Routery .................................. 123/58 C |
| 4,518,053 | 5/1985 | Queveau ................................ 180/370 X |
| 4,763,751 | 8/1988 | Gardner, Jr. ............................. 180/305 |
| 4,865,152 | 9/1989 | Gardner, Jr. ............................. 180/305 |
| 5,064,013 | 11/1991 | Lenz ....................................... 180/65.3 |
| 5,099,749 | 3/1992 | Darish ..................................... 91/61 X |
| 5,192,001 | 3/1993 | Bianco .................................. 417/415 X |
| 5,284,423 | 2/1994 | Holdsworth et al. ................. 417/415 X |

*Primary Examiner*—Hoang Nguyen
*Attorney, Agent, or Firm*—Polster, Lieder, Woodruff & Lucchesi

[57] ABSTRACT

The field of the invention is one in which an electric motor drives a helically grooved shaft to displace a hydraulic fluid pumping piston to feed the hydraulic fluid under pressure through a flow directing and control system to energize the motion of a piston on a helically grooved second shaft to drive the second shaft which is able to supply the motion power to drive a vehicle, or to provide power to drive a shaft for other useful purposes, and to apply the mechanical advantage to be developed between pistons having a small and a large area relationship in a closed hydraulic fluid circulating loop where electric drive for one piston results in power output from the other piston.

12 Claims, 6 Drawing Sheets

HYDRAULIC ASSIST PROPULSION APPARATUS FOR VEHICLE DRIVE

BACKGROUND OF THE INVENTION

1. Field of the Invention

The invention is directed to electric drive for hydraulic fluid piston pump to deliver fluid under pressure to a hydraulic fluid driven piston mounted on a power output shaft rotated by movement of the driven piston.

2. Description of the Prior Art

The known examples of prior art for converting reciprocating motion to rotary motion to perform work requiring rotary load input include Hartwig U.S. Pat. No. 583,802 of 1897, and Rice Jr. U.S. Pat. No. 465,100 of Dec. 15, 1891; McCollum U.S. Pat. No. 617,762 of Jan. 17, 1899; Eager U.S. Pat. No. 771,864 of Oct. 11, 1904 and U.S. Pat. No. 783,111 of February 1905; Tosco et al U.S. Pat. No. 1,024,379 of Apr. 23, 1912; and Mackle U.S. Pat. No. 1,369,256 of Feb. 22, 1921. These patents are operated by pressure fluid such as air or steam.

Other known examples in the prior art for propelling land or water crafts include Conterco U.S. Pat. No. 1,699,687; Roth U.S. Pat. No. 3,205,965 of Sep. 14, 1965; Gardner Jr. U.S. Pat. No. 4,763,751 of Aug. 16, 1988 and U.S. Pat. No. 4,865,152 of Sep. 12, 1989; and Lenz U.S. Pat. No. 5,064,013 of Nov. 12, 1991. This group of prior art should include Conrad U.S. Pat. No. 4,413,698 of Nov. 8, 1983 and Routery U.S. Pat. No. 4,462,345 of Jul. 31, 1984.

SUMMARY OF THE INVENTION

The preferred embodiments of the invention are directed to hydro-mechanical apparatus adapted to be energized by an electric motor, and arranged with components that can require relatively less current to run the electric motor which is the primary input source of the driving power.

It is a unique form of the invention to provide between the electric motor and a load a device that will be able to reduce the need for a larger electric motor so that the time intervals can be increased between needs for recharging one or more batteries used to make the embodiments portable.

In accordance with the field of the invention the electric drive in a form of propulsion apparatus is composed of an electrically driven spirally grooved shaft to displace a piston in linear directions for pumping hydraulic fluid into a fluid flow control means connected to a second cylinder which houses a piston propelled by the hydraulic fluid to rotate a spirally grooved shaft which is rotated by motion of the second piston to provide rotary drive for vehicle wheels or other devices.

An important object of the invention is to select relative areas for the pistons in the preceding explanation so that the mechanical advantage of the piston sizes is obtained by relating the pistons in a closed hydraulic loop.

A further object of the invention is the conversion of the rotary motion of a closed helix threaded shaft which displaces a piston back and forth on the said shaft whereby hydraulic fluid pressure from a small area piston on one shaft can be controllably connected to a large area piston on another shaft so that the large area piston is made to deliver torque from the shaft initiated by the movement of the small area piston.

Each shaft is grooved with two pairs of helix threads, with each pair closed on each end by a bridge over channel, sometimes referred to as a roll over channel.

A still further object of the invention is to select different helix thread angles so that a small area piston on the shaft in a small diameter cylinder is driven to force hydraulic fluid into a large diameter cylinder where the helix shaft therein is driven in rotation by the displacement of a large area piston.

Another object of the invention is to provide a hydraulic assist propulsion apparatus for vehicle drive in which an electric motor drives a fluid pump having a first volumetric displacement to power a larger fluid pump having a second volumetric displacement to utilize the light force from the first pump to obtain a proportionately strong force from the second pump.

Another object of the invention is to develop a displacement of hydraulic fluid in a small diameter cylinder by actuation of a small area piston moving at an incremental displacement to produce a first force which can be relayed to a larger area piston moving in a larger cylinder at a lesser incremental displacement to generate a greater force.

A further object of the invention is to convert a shaft rotary motion into a linear displacement of a piston which then displaced hydraulic fluid to cause a linear displacement of a second piston to rotate a shaft carrying the second piston.

Another object of the invention is to produce a mechanical advantage for vehicle drive by the relative areas of two pistons mounted on closed-helix grooved shafts whose numbers of threads per unit of displacement is varied such that the relative displacement of one piston by a driven shaft effects displacement of a second piston which then drives a second shaft.

In effecting the transfer of forces from a powered shaft to a driven shaft the shafts carry pistons having diametrically opposed pivoting thread segments the object of which are to transfer a rotary force from one shaft to displace a piston for delivery of a hydraulic fluid to displace a second piston for rotating a shaft to deliver driving torque, and in either case the pistons are prevented from revolving so that the transfer of hydraulic fluid by displacement of one piston displaces the other piston to obtain shaft rotation.

It is a further object of the invention to convert rotary motion of a first shaft having two pairs of closed-helix threads or grooves which cause a piston to shuttle back and forth on that first shaft to force hydraulic fluid into a driven piston movable on a second shaft having likewise two pairs of closed-helix threads or grooves to displace the driven piston to rotate the second shaft, and to form the closed-helix threads on the respective shafts with roll over channels sufficient to reverse the direction of travel of the pistons for uninterrupted shuttle of the first piston to maintain rotation of the second shaft in a desired unitary direction.

Yet another object of the invention is to provide a hydraulic fluid control unit so that the alternate back and forth movement of a piston on a shaft driven by an electric motor transfers the hydraulic fluid appropriately to displace a second piston for driving a torque output shaft to drive a desired load like the wheels of a vehicle.

DESCRIPTION OF THE DRAWINGS

The embodiments of the invention are depicted in the following drawings, wherein.

DETAIL DESCRIPTION OF THE INVENTION

Figure 1:
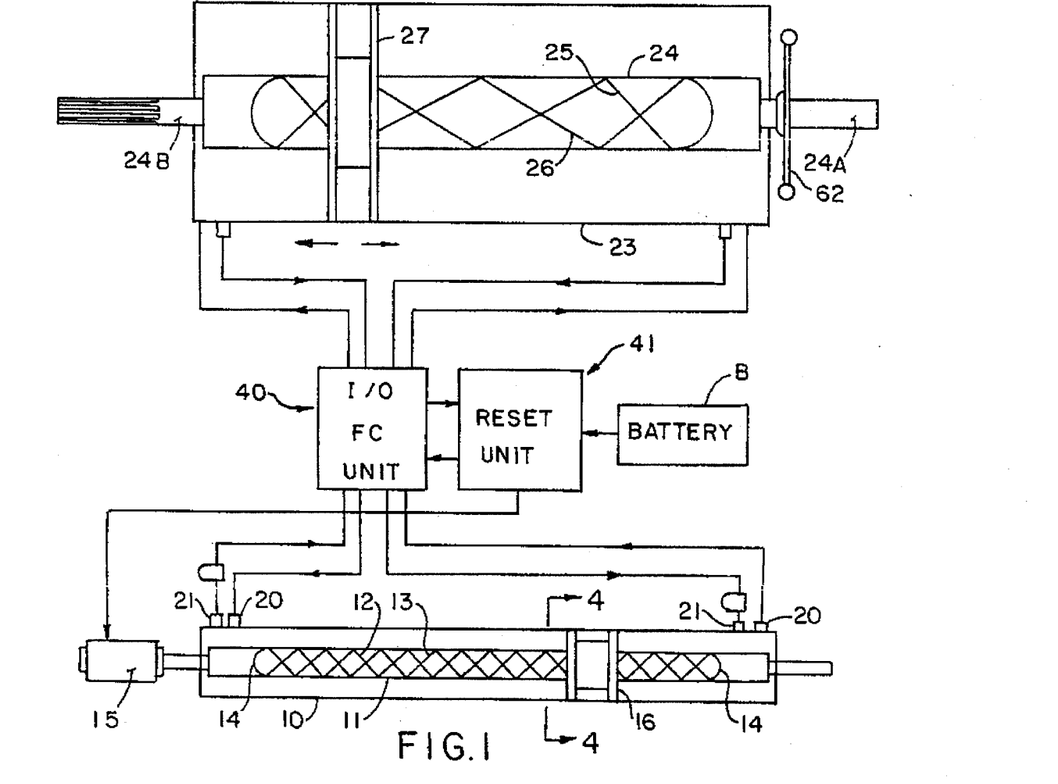
FIG. 1 is a block diagram view of the several components making up the primary disclosure of the cooperating cylinders for hydraulic assisted propulsion.
Figure 2:
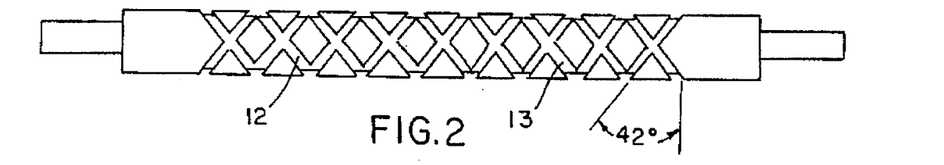
FIG. 2 is an enlargement of a pumping shaft in FIG. 1 formed with two pairs of spiral grooves having opposite pitch for displacing a pumping piston in alternate directions; if said view of the pumping shaft is revolved ninety degrees the new view will expose the roll over channels similar to end channels of FIG. 3A.

The over-all disclosure of the apparatus is depicted in the block diagram of FIG. 1. That apparatus comprises a hydraulic fluid pumping cylinder 10 operatively supporting a rotary shaft 11 formed with two pairs of closed helix thread grooves 12 and 13 with each pair having interconnected roll-over channels 14 at the respective ends. The shaft 11 is suitably mounted in bearings (not shown) at the sealed ends of the cylinder 10, and a variable speed electric motor 15 is connected to one exposed end of the shaft 11. A piston 16 is operatively mounted on the shaft 11 so it can operate back and forth along the shaft to displace hydraulic fluid from the cylinder at one end and draw in fluid at the opposite end. To achieve the piston 16 reciprocation, the shaft 11 (FIGS. 1 and 2) is formed with pairs of helix threaded grooves 12 and 13 which are joined in interconnecting relation at the opposite ends by "roll-over" channels 14. The helix thread grooves in each pair are cut to be 180 degrees from each other on opposite sides. These grooves, or spiral threads, are required to drive the piston 16 along the shaft 11 at a speed or rate of motion commensurate with the pitch angle of substantially 42°, as is indicated in FIG. 2. The cylinder 10 is provided with hydraulic fluid inlet valves 20 at each end and outlet valves 21 also at each end. These valves have spring action ball elements to limit flow in one direction when connected into a suitable hydraulic fluid flow system to be referred to at FIGS. 5, 5A, and 6.

Figure 3:
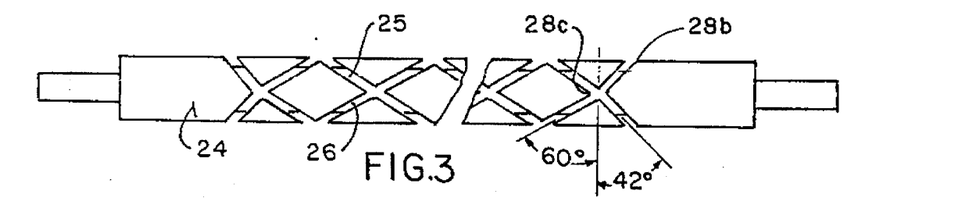
FIG. 3 is a foreshortened power output shaft in FIG. 1 having spiral grooves of a greater pitch than the grooves in the shaft of FIG. 2 for displacing a second piston to rotate the shaft.

The apparatus of FIG. 1 comprises a power output cylinder 23 which operatively supports a driven shaft 24 having outwardly extended ends 24A and 24B. The shaft 24 is operatively mounted in suitable end bearings (not shown), and two pairs of helix threads or grooves 25 and 26 are formed in the shaft 24 to be 180° apart, or opposite each other, as compared in FIGS. 3 or 3A. The pitch or groove angles as depicted in FIG. 3 as having an angle of 60° which is the equivalent of the included lead and lag angles for the grooves. The grooves are interconnected at the opposite ends in roll-over channels 28 (see FIG. 3A) which steepen to a tangential angle of 42 degrees between the last cross-over point 28C and apex 28B. The cylinder 23 is larger in diameter to receive the spiral grooved shaft 24 which mounts a large area piston 27 for reciprocation in the cylinder 23.

Both pistons 16 and 27 are formed with internally mounted and diametrically opposed pivoting thread bodies 32 (see FIG. 4B) which have thread segments 31 fit into the opposed thread grooves, as grooves 12/13 on shaft 11 (FIG. 4B) or grooves 25/26 on shaft 24 (FIG. 3). The pivoting thread body 32 comprises a drive engaging element 31 integrally formed on the body 32. The thread engagement elements 31 are aligned in the helical groove by using a screwdriver (not shown) inserted in the slot 29 (see FIG. 4D) retained in place by cover means 30 (FIG. 4E). Two opposed cover means 30 are required to enclose the pivoting thread segments that are diametrically opposed. The view of FIG. 4A shows the hole 35 in the piston which receives the thread bodies 32.

Figure 4:
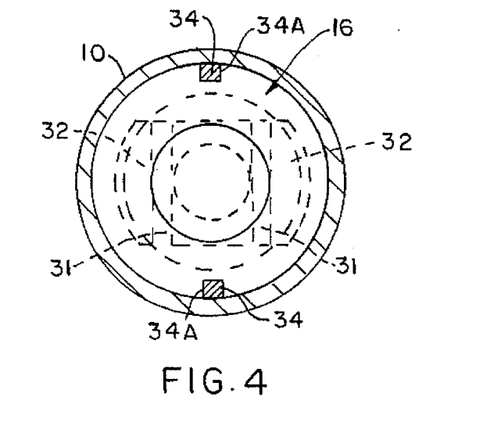
FIG. 4 is a sectional view of a pumping cylinder and piston seen along line 4—4 in FIG. 1 showing the face and dotted detail of the pivoting thread segments engaged in the spiral grooves of a rotary shaft.

The view of FIG. 4 is a transverse section taken along line 4—4 in FIG. 1 to reveal a face view of the piston 16 in the cylinder 10. The piston faces 33 slide along in the cylinder and engage opposed track rails 34 (see FIG. 4A) fastened inside the cylinder to receive matching notches 34A cut into the piston face 33 to prevent the piston from rotating with rotation of the shaft 11.

Figure 4A:
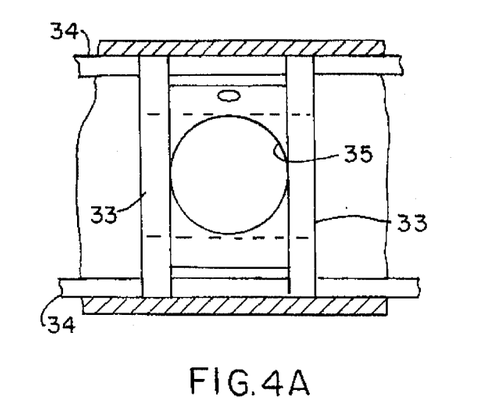
FIG. 4A is a fragmentary longitudinal view partly in sections to show the side view of a pumping piston.

The view of FIG. 4A is a longitudinal section of the cylinder 11 to show the position of the opposite faces 33 of piston 16 held in separation by the body of the piston in which there are two circular mounting holes 35 diametrically opposed. Each hole 35 receives a pair of pivoting thread segments 31 carried on body 32 which is free to revolve and follow the shape of each respective spiral groove 12 or 13 (see FIG. 4B). The covers 30 keep segments from disengaging their grooves. The view of FIG. 4A shows the fixed bars 34 carried in the cylinder to engage matching notches 35 in the piston faces to prevent piston rotation. When thus prevented from rotating the piston can slide linearly in the cylinder, so it is able to advance at the rate or speed of rotation of the shaft 11 as determined by the pitch angle of the spiral grooves 12 and 13.

Figure 4B:
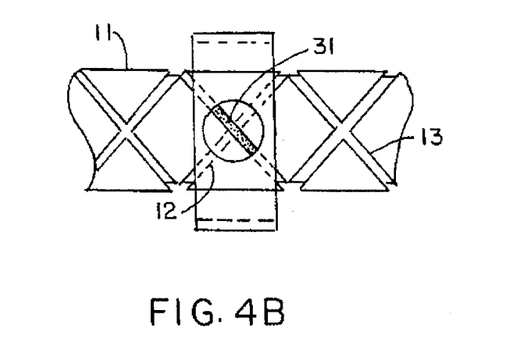
FIG. 4B is a representation of the engagement of a thread segment engaged in a helical groove as the piston travels along the shaft.
Figure 4C:
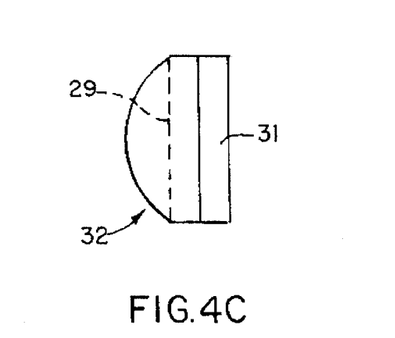
FIG. 4C is a view of a typical pivoting thread body for driving the piston in response to shaft rotation.
Figure 4D:
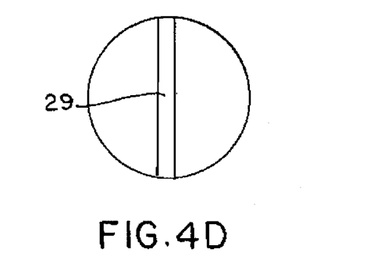
FIG. 4D is a face view of the thread body of FIG. 4C showing a screw driver alignment slot.
Figure 4E:
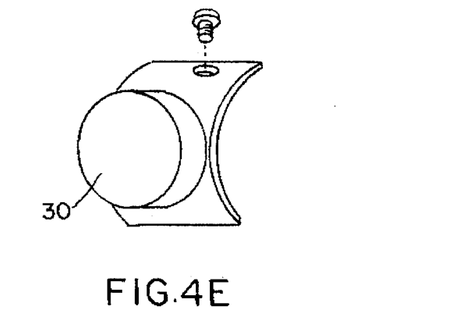
FIG. 4E is a perspective view of a cover to hold the thread bodies in position in the piston of FIG. 4A.

The detail seen in FIGS. 4, 4A, and 4B relate to the piston operatively mounted in cylinder 10, the equivalent detail is also applicable to the piston 27 seen in FIG. 1, but on an enlarged scale since the cylinder 23 has an increased diameter relative to cylinder 10.

Figure 3A:
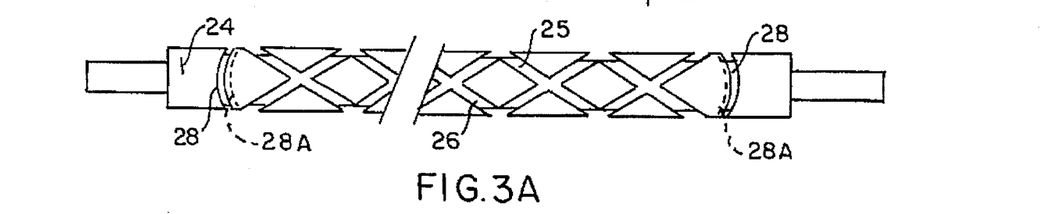
FIG. 3A is a view similar to that shaft in FIG. 3 rotated ninety degrees to show roll over end channels for the spiral grooves.

Turning now to the structure seen in FIGS. 1, 3, and 3A, it can be seen that the unique requirements of shaft 11 and 24 are to be driven and to drive. In its driven mode the shaft 24 is formed with helix grooves having angles of substantially 60° as suggested in FIG. 3. More acute thread angles will impede the drive of piston 27 on shaft 24, and when the piston 27 reaches the roll-over channels 28 (FIG. 3A), it will trigger a microswitch 60 or 61 of FIG. 5 in order to open hydraulic fluid ports for communicating with the hydraulic pressure fluid for effecting the reverse drive of the piston 27. The reverse drive will be explained presently, but for now it is seen in FIG. 3 that the roll-over channel 28 has an entry angle of 42 degrees. Thus, the pivoting thread segment 31 rotates in place in order to clear the apex 28B (FIG. 3) which must be sufficiently enlarged (see 28A of FIG. 3A) so the segment 31 can move through the sharp bend in the shape of the groove 25 or 26, depending on which end of the shaft is reached by the piston 27.

Figure 5:
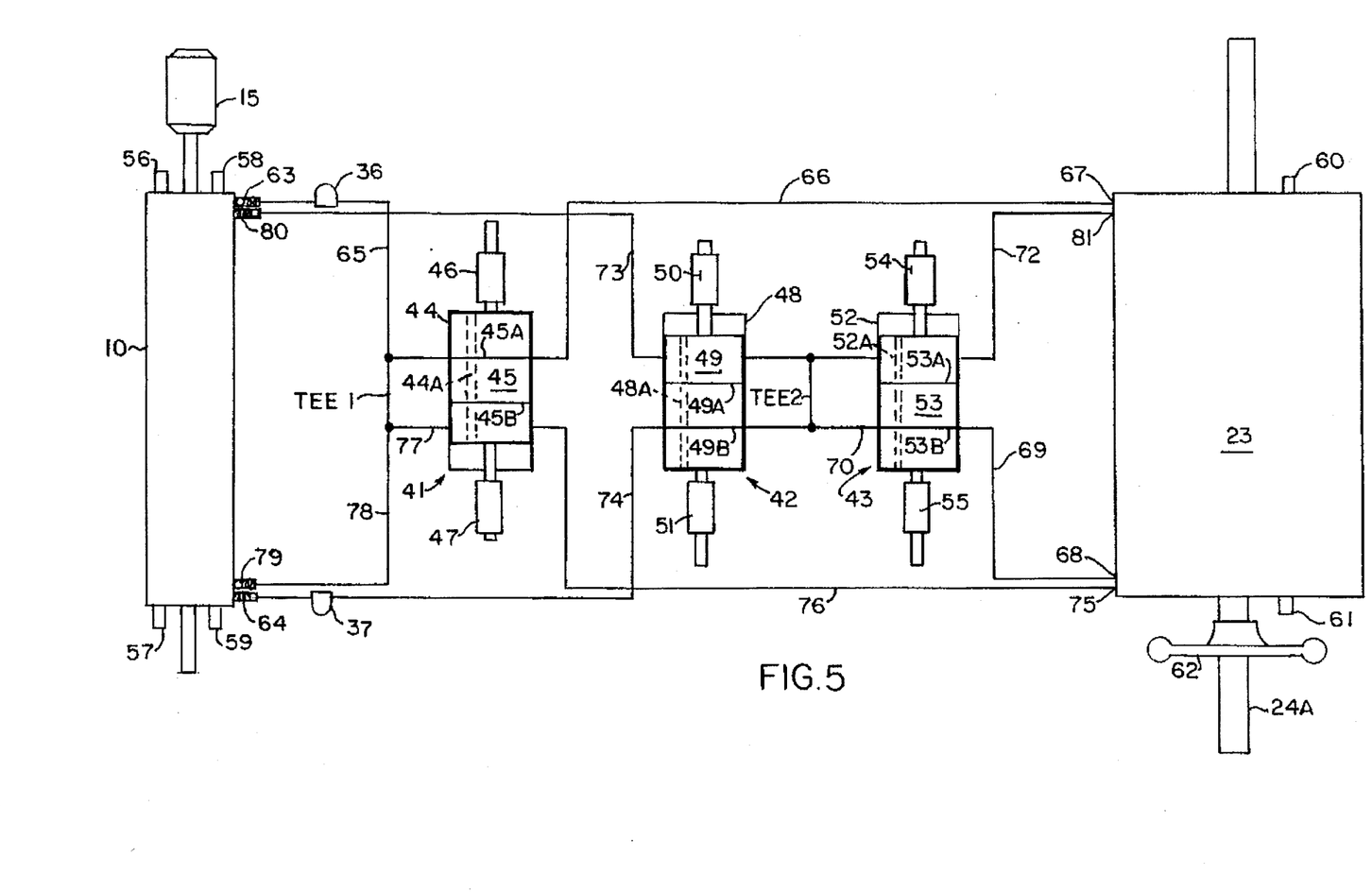
FIG. 5 is an enlarged diagrammatic layout of the make-up of the I/O FC Unite seen in FIG. 1 for the transfer of the hydraulic fluid under pressure between the pumping cylinder and power output cylinder.

FIG. 5 is a view of an electro-hydraulic circuit between the pumping cylinder 10 and the driving cylinder 23. In FIG. 1 that circuit is indicated to be the I/O FC Unit 40, and the RESET UNIT 41 to be indicated in FIG. 9. The electro-hydraulic circuit in FIG. 5 is composed of three hydraulic valves 41, 42, and 43. A description of one valve 41 will be an example of the other valves so the reference numerals and terminology will be similarly noted. For example, valve 41 has a housing 44 which contains a shuttle 45 operably connected to solenoids 46 and 47. The shuttle 45 has two throughput channels 45A and 45B which have suitable ports to receive conduits which alternately enable a fluid throughput when aligned with the outside ports of the housing. When one channel 45A lines up, the other 45B does not. Thus an alternating path through the valve 41 is created by the action of their respective solenoids 46 or 47. Valve 42 has housing 48 to contain a shuttle 49 which is connected to solenoids 50 and 51. Valve 43 has a housing 52 to contain a shuttle 53 connected to solenoids 54 and 55. In each housing the respective shuttles have channels 44A, 48A and 52A which allow quick passage of fluid from one end of a housing to the opposite end so the shuttle movement can be cushioned by the fluid.

Figure 5A:
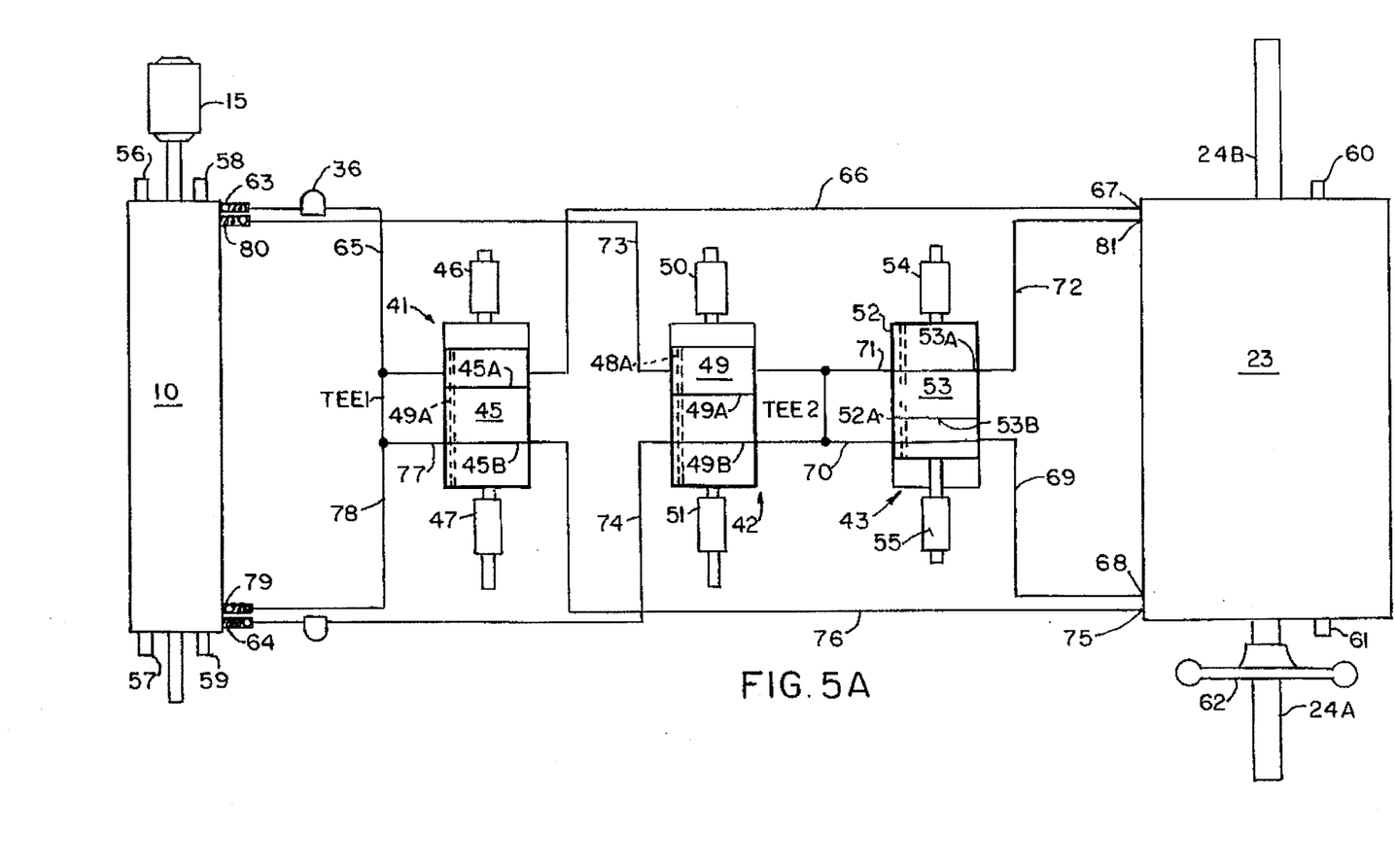
FIG. 5A is an enlarged diagrammatic layout similar to FIG. 5 to illustrate an alternate phase of the transfer of hydraulic fluid between the pumping cylinder and power output cylinder.
Figure 6:
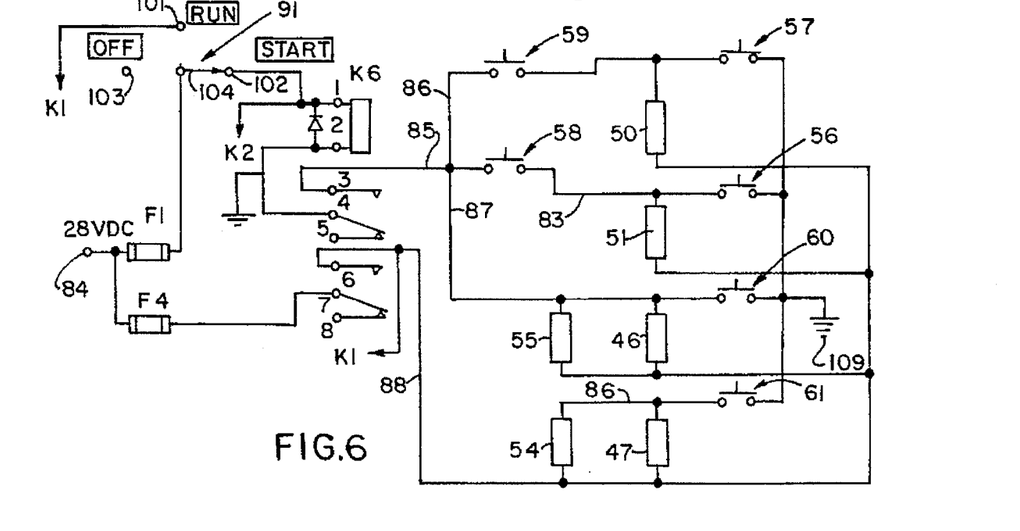
FIG. 6 is a diagrammatic layout of a microswitch control circuit which is part of the reset unit seen in FIG. 1.

Before describing the operative function of the electro-hydraulic circuit of FIG. 5 it is important to understand certain electro-hydraulic devices in FIGS. 5, 5A, and 6. Thus, the pumping cylinder 10 is provided with microswitches 56 and 57 at opposite ends, and pressure sensing switches 58 and 59 at opposite ends. The respective microswitches are actuated by the piston 16 since the physical positions of the piston is important to result in reciprocation of the piston in opposite directions without changing the rotational direction of the shaft 11. The cylinder 23 is provided with microswitches 60 and 61 at its opposite ends. In addition the shaft 24A of cylinder 23 carries a suitable fly wheel 62, the purpose for which will appear presently.

The hydraulic fluid flow conduits associated with cylinder 10 are equipped with hydraulic accumulators 36 and 37. Their purpose is to absorb any and all fluid pressure impulses, and to act as oil reservoirs.

The Functional Diagram

The operation of the apparatus is depicted in FIGS. 5 and 5A. Frequent references will be made to other drawing views. It is assumed that the shaft 11 in pumping cylinder 10 has been driven by the motor 15 (FIG. 5) to cause the piston 16 to advance to the top of the cylinder 10 to displace hydraulic fluid through check valve 63 while return hydraulic fluid is drawn into the cylinder 10 behind or on the suction side of the piston 16 at inlet 64. Because of the initialized position of shuttle 45 in valve 41 being up and shuttle 53 in valve 43 being down at this time it is assumed the power piston 27 is moving down and energizes microswitch 61 which energizes solenoids 47 and 54. Solenoid 47 moves its shuttle 45 down to open conduit 65 and simultaneously solenoid 54 moves shuttle 53 to the up position. These two functions are responsive to the piston 16 movement and the initialization process to be discussed with FIG. 6.

In a similar way to cylinder 10 the power cylinder 23 is equipped with microswitches 60 and 61 at its opposite ends. These microswitches 60 and 61 are actuated by the piston 27 as it traverses the roll-over channels 28. The element 31 (see FIG. 4B) is also present in the piston 27 for the cylinder 23. Since this element carries half the load during travel longitudinally of shaft 24 the fly wheel 62 provides the needed rotation momentum as the piston 24 traverses the roll-over channels 28. The actuation of any of the solenoids is intended to snap the shuttle body to the side where the energized solenoid is located and latch the shuttle in that position. The electrical circuits for the several microswitches and solenoids are seen in FIG. 6 while the function of the microswitches and solenoids are shown in FIG. 5 which will be described in relation to the hydraulic fluid flow conduits and TEE connections in the system. On power cylinder 23 the microswitch 60 is electrically connected to solenoids 46 and 55, and microswitch 61 is electrically connected to solenoids 47 and 54. The pumping cylinder 10 has a microswitch 56 and 57 at its opposite ends and pressure sensing switches 58 and 59 also at the opposite ends.

Referring to the functional operation of the diagram of FIG. 5, it is assumed that the shuttles are positioned so that shuttle 45 is raised by energization of solenoid 46 to admit hydraulic fluid from pumping cylinder 10 to conduit 65, then through passage 45A in valve 41 which connects to conduit 66 and directs flow into the cylinder 23 at the top inlet port 67. This function occurs with the power piston 27 at the top of the cylinder 23 to trigger the microswitch 60 so the hydraulic fluid that enters at inlet 67 will push piston 27 down on shaft 24, thus rotating the shaft 24. The bottom outlet exhaust port 68 from cylinder 23 will direct outlet fluid into conduit 69 which passes through the passage 53B in shuttle 43 in housing 52 to conduit 70. If solenoid 51 pulls shuttle 49 down to connect conduit 70 through passage 49B to branch conduit 74, the hydraulic fluid enters the pumping cylinder 10 at inlet 64. If shuttle 49 is raised, that means the flow of fluid in 70 will flow through TEE-2 and into conduit 49A so it will pass through housing 48 and into passage 49A and into conduit 73 and back to pass cylinder 10 at inlet 80.

When the power piston 27 is to be moved up (see FIG. 5A) and triggers the bottom microswitch 61 of circuit in FIG. 5A is made to apply voltage to solenoids 47 and 54 for simultaneously setting shuttle 45 into its bottom position and shuttle 53 into its top position. Thus with shuttle 45 down and shuttle 53 up fluid is forced to flow into the bottom pressure port 75 from conduit 76 from valve 41 because the shuttle 45 is pulled down to open passage 45B which connects into conduit 78 and pressure port 79 of cylinder 10. It is imperative to note here that cylinder 10 has outlet valves 63 and 79, and inlet ports 80 and 64 as fluid return ports.

The functional operation of FIG. 5A is related to supply pressure fluid at the bottom of the power cylinder 23. If the pumping cylinder 10 is supplying pressure fluid from the top outlet 63, that flow will be directed by energizing solenoid 47 to pull shuttle 45 down so conduit 65 connects across the TEE1 conduit to valve conduit 45B which directs the flow in conduit 76 and into inlet port 75 to raise the piston 27. If the pumping cylinder moves to discharge pressure fluid at outlet 79 that fluid flows in conduit 78 and through shuttle 45B passage so it supplies conduit 76 and port 75 to push piston 27 up.

In a necessary review of the hydraulic flow patterns in FIGS. 5 and 5A, it can be understood from the foregoing drawing views that the electric motor 15 rotates shaft 11 which moves the piston 16 alternately (up and down) along the shaft 11 so that in one direction fluid flows out into conduit 65 and fluid suction flows inwardly at conduit 64, or out from 79 and inward at 80. In either event, the outgoing pressure fluid in conduits 65 or 78 must traverse the passages 45A or 45B in valve 41 and flow along conduits 66 or 76 depending on the direction of motion of the drive piston 27 which rotates the shaft 24 and controls solenoids 46 and 47. For example, if the piston 27 is on the rise in cylinder 23, the pressure fluid supply under the piston 24 must have the shuttle 45 lowered by energizing the solenoid 47 and the piston 14 can either travel up or down in the pumping cylinder 10 so that pressure fluid can use the TEE-1 conduit to feed into conduit 76 to raise piston 24. Concurrently, the exhaust port 81 from cylinder 23 will use conduit 72 to exit valve 43 with the solenoid 54 energized to move shuttle 53 up. Thus the discharged hydraulic fluid from power cylinder 23 can flow in one of two ways from the TEE-2 junction coupled by 71. If piston 16 is moving up to deliver fluid into conduit 65, the shuttle 49 in valve 42 must be positioned so the conduit 74 will be open to allow discharged fluid in conduit 71 to pass through the TEE-2 conduit 71 and into conduit 74 to return to the pumping cylinder 10. If the pumping piston 14 is moving down to supply pressure fluid through outlet 79, conduit 78, and valve 41, the discharge fluid in conduit 72 must feed the shuttle 49 in valve 42 up by energizing solenoid 50 so the discharge flow will be into conduit 73 and check valve 80. From the foregoing description, it will appear that the valve 42 and the position of its shuttle 49 will effectively control the respective return flow of the pumping piston. The initial direction for piston 27 so that the shaft 24 will always rotate in the same direction is set when switch 91 has its arm 104 engaged with contact 102 (FIG. 6). The unitary or same direction of rotation of shaft 24 will be governed by the spiral grooves in the shaft which come into play for matching the rotation of the shaft 24 by movement of the piston 27. Note that in FIG. 5 the circuit depends on the position of shuttle 45 in valve 41, and the same dependency on valve 43 with respect to shuttle 53 is evident in FIGS. 5A and 6.

FIG. 6 diagrams the circuits for the control of the microswitches 56 and 57 responsive to the movement of the pumping piston 16 as the electric motor 15, powered by battery B, drives the shaft 11. The piston pumps hydraulic fluid through either delivery ports 63 or 79, while the opposite inlet ports 64 or 80 receive the hydraulic fluid flowing back to cylinder 10. There is an arm 104 in switch 91 movable to engage with contacts 101 or 102. There is an "off" position at contact 103. When the switch arm 104 is moved to the "start" contact 102, the current from the battery supply 84 energizes a relay K-6 which closes contacts 3 and 4, and 6 and 7 which power up leads 85 and its branches 86 and 87, and also lead 88. The respective switches 58, 59, 56, 57 and 60, 61 become active at the appropriate time when the pistons 16 and 27 reach the end travel positions to result in actuation of the microswitches and pressure switches. Also, FIG. 6 discloses a control circuit for the several microswitches 56, 57, 60, and 61, together with the related pressure switches 58 for valve 41, for valve 42 and for valve 43. The control circuit wiring diagram is seen generally in FIG. 6 and comprises a manually controlled switch 91 having positions "off", "run" and "start". The current for the circuit is from a contact 84 for a 28 VDC battery B shown in FIG. 1. The pressure switch 58 and 59 are closed by the action of the piston 14 as it moves into its opposite end travel and builds pressure before it. In the switch 91 position 102 "start" (and only then) pressure sensors 58 and 59 are used to energize solenoids either 50 or 51 associated with valve 42 for the appropriate pressure fluid return to cylinder 10. In addition, valves 41 and 43 are initialized by closed contacts of relay K-6 to set shuttles 45 up in the respective valves 41 and 43 and shuttle 53 down so that the direction of piston 27 travel and hence shaft 24 rotation will be in the same direction at each "start" action. Furthermore, there are pressure switches 58 and 59 at the respective ends of the cylinder 10 to indicate when the piston 14 has reached its end stroke at the spiral roll over of the channels 12 and 13. In addition, there are microswitches 60 and 61 at the ends of the power cylinder 23 to indicate when the piston 27 has reached its roll over position at the spiral channels 25 and 26 in the shaft 24. When the microswitches 56 or 57 are closed by piston 16 it provides electrical continuity to the solenoids 50 and 51 respectively. The function of that arrangement is to obtain immediate solenoid snap response to shift the shuttle 49 in valve 42 to provide a return fluid channel for the fluid flow to cylinder 10. Solenoid 51 is wired by lead 83 to microswitch 56 and pressure switch 58. Microswitch 60 is wired into solenoids 46 and 55 by lead 87, and microswitch 61 is wired into solenoids 47 and 54. The principal power lead 85 to the foregoing circuits comes from the relay K-6 and its branch leads 86 and 87.

It is important to track the power cylinder piston 27 so that its shaft 24 will revolve in the same direction each time the ignition switch 91 is set to "start". The view of FIGS. 5 and 6 disclose the electrical continuity of microswitch 60 in relation to solenoids 46 and 55, and of microswitch 61 in relation to the solenoids 47 and 54. These several relationships are described in FIGS. 5 and 5A. Thusly, the switch 91 in position "start" initializes shuttles 45 and 53 to cause shaft 24 to revolve in the same direction at each "start" and to continue on in the same direction when switch 91 is in "run" position 101. The electrical source for the above solenoids is: ground 109 and voltage of battery B at contact 84.

Figure 7:
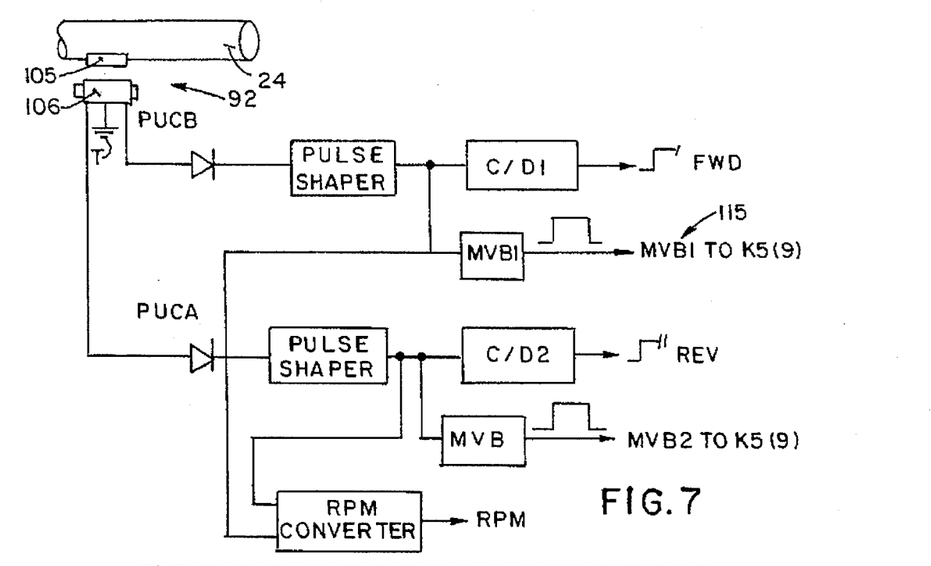
FIG. 7 is a block diagram for detecting the direction of rotation of the power output shaft.
Figure 8:
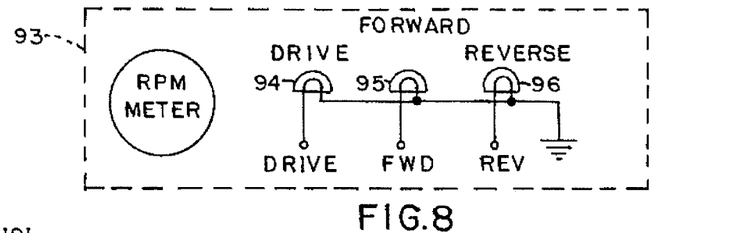
FIG. 8 is a block diagram of the read out panel to show the status of the power output shaft and the go no go status of a vehicle.

In FIGS. 7 and 8 it can be seen that means is provided to determine if the power output shaft 24 will revolve in the same direction each time the ignition is set to "start". These provisions include a flywheel 62 (see FIG. 1) and a shaft rotation pick up coil assembly 92 (FIG. 7) which comprises a magnet 105 on shaft 24 and a detection coil 106 connected with a grounded center tap T. The coil assembly will detect the direction of rotation of the shaft 24, and panel 93 in FIG. 8 will light up the appropriate indicator lights 94, 95, and 96 to show whether shaft 24 is in forward or reverse rotation. If the reverse light 96 comes on, the system of the I/O FCU 40 (FIG. 1) has a malfunction. If no light comes on there is nothing that works in the system. If FORWARD light 95 comes on rotation of power shaft is in the designed direction, and as DRIVE light 94 comes on the Vehicle (not shown) is in motion, or about to be put in motion.

The General Operation of the Apparatus

Figure 9:
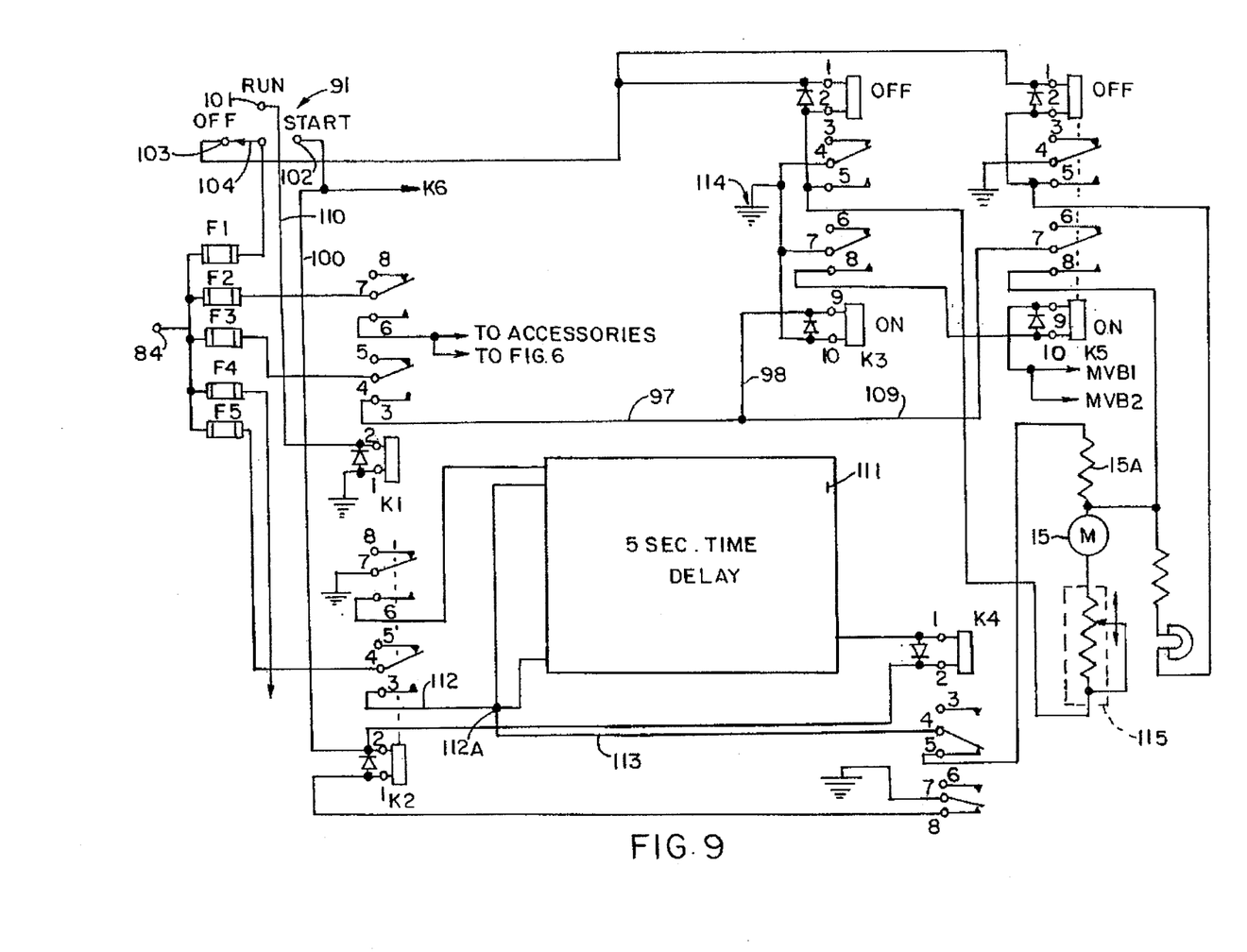
FIG. 9 is a wiring diagram of the battery powered reset unit seen in FIG. 1.

Reference will be directed to the diagram of FIG. 9, and with references to FIGS. 1, 6, and 9 also as required.

The battery power input is at contact 84 through five fuses F1–F5 which admit required voltage to the circuits in the apparatus. When the switch 91 is initially placed in the "run" position (See FIG. 9) at contact 101 the relay K-1 is energized through lead 110 which closes contacts 6 and 7 to provide voltage to the accessories which include the circuit in FIG. 6 as well as lights, directional signals, radio and the like (not shown). Relay K-1 via leads 97 and 98 also delivers a voltage to relay K-3 solenoid contact 9 to latch K-3 to the ON side.

When the switch 91 has its arm 104 placed at contact 102 "start" an operator thusly initializes the driving apparatus. Holding that position is desired until the lights in the readout circuit 93 of FIG. 8 come on. This time closed contacts 3 and 4 of relay K-2 supply the voltage to the motor 15 via lead 112 and branch lead 113 which close contacts 4 and 5 of relay K-4. At this time relay K-3 is latched to the on position through leads 97 and branch 98, its closed contacts supplying the ground 114 to the motor 15 via the accelerator 115. The motor thusly is in idle mode. Relay K-3 has contacts 7 and 8 which make ground connection 99 to the terminal 10 of Relay K-5.

In the position of arm 104 in the switch 91 in the "start" position does not energize Relay K-1, but the Relay K-2 energizes this time through lead 100. Relay K-2 becomes energized because Relay K-4 is de-energized and provides a ground continuity to Relay K-2(1) via its closed contacts 7 and 8.

Switch 91 also delivers the voltage to K-4(2), but K-4 does not energize because there is no ground on terminal 1. A device 111 hereby called a five second delay is not energized at this time.

Closed contacts 3 and 4 of K-2 deliver the voltage to three places. Two places lead to the time delay 111 via common point 112A, and lastly to the electric drive motor. The latter is via the closed contacts 4 and 5 of K-4 and a resistor 15A shown on top of the motor symbol (Variable Direct Current Motor). Closed contact 6 and 7 of K-2 deliver a ground to time delay device 111 for a later application to K-4, if necessary.

The DC Motor 15 will now drive Piston 14 at some slow RPM. The Microswitch Control of FIG. 6 will be in operation, and, hence, Shaft 24 will revolve.

Shaft 24 Rotation Detector of FIG. 7 will pick up an electric pulse from the Pick Up Coil 106 in FIG. 7. The FWD signal 95 will light the FORWARD light on the Readout Panel 93, and the MVB1 signal 115 will appear on the solenoid of K-5 terminal 9. MVB1 will latch K-5 to the ON position. Closed contacts 7 and 8 of the relay K-5 will deliver the full voltage to the "top" of the motor 15 via 109. Also, closed contacts 4 and 5 of K-5 will deliver a ground to the light 94 on the READOUT PANEL 93 labeled DRIVE. With that light 94 on, the vehicle operator now can release SW1 to the switch arm 104 "run" position. In the "run" position, relay K-2 will de-energize and remove the voltage on lead 113, originally from contacts 4 and 5 of K-4, and which is now not required, from the current limiting resistor 15A shown on top of the motor 15.

The variable resistor labeled ACCELERATOR 115 is now available to be foot operated, and to accelerate the vehicle.

It will appear from the foregoing description that the subject matter set forth has utility in connection with improving the application of electric motor power applied to vehicle propulsion so that the present and past attempts to provide electric drives to vehicles can avoid the excessive size of the electric power source and increase the travel range of a vehicle between recharging events. In order to accomplish this objective the hydraulic propulsion apparatus for vehicle drive comprises an electrically operated fluid pumping device 10 having first piston means 16 for exerting a linear directed pressure from a body of hydraulic fluid, a power output hydraulic driven device 23 having second piston means 27 for converting the linear directed fluid pressure into hydraulic torque generated power output, fluid flow directing means 40 and displayed in FIGS. 5 and 5A connected between the fluid pumping device 10 and the power output driven device 23 for applying the linear directed force to the driven device 23 to obtain a torque driving force, and operating the propulsion apparatus by a suitable electric motor 15.

If a malfunction occurs and no lights come on at the READOUT PANEL 93 after five seconds have elapsed, and the vehicle operator keeps the switch arm 104 in the "start" position, the five second time delay device 111 will complete its operation.

The 5 SEC TIME DELAY circuit in box 111 is provided to protect the electric motor 15 in case something happened to keep Shaft 24 from revolving. Holding switch 91 on in "start" position for five seconds when K-2 is energized, its outputs, voltage at 112 and ground off contact 6, enable the device 111 to function. On completion of its internal sequence, set to five seconds, the device 111 will place a ground on terminal 1 of K-4 energizing it. This is because line 100 from the switch 91 was there at the "start" position also. Energized K-4 opens contacts 4 and 5 removing the voltage from the current limiting resistor 15A shown on top of the variable dc motor 15. Contacts 7 and 8 open and deenergize K-2 preventing the operator from keeping the motor from unnecessary overheat condition.

When the vehicle operator sets arm 104 in switch 91 to the OFF position, the line voltage is applied to the OFF solenoids, terminals 1 of K-3 and K-5. This latches the relays to the OFF position, thereby removing the ground 110 from the accelerator 115, the ground from the DRIVE light, the drive voltage 109 from the motor 15, and the voltage from all microswitch circuits.

Various changes and modifications may be made by those skilled in this art without departing from the scope of the foregoing disclosure.

What is claimed is:

1. Hydraulic propulsion apparatus for a shaft drive comprising:

a) an electrically operated hydraulic fluid pumping device in a first cylinder having a rotary shaft in said first cylinder carrying a non-rotatable first means for exerting a linear directed pressure flow from a body of hydraulic fluid in said cylinder;

b) a second cylinder spaced from and independent of said first cylinder carrying a second rotary shaft having a non-rotative power output hydraulic fluid driven device;

c) conduit means interconnecting said first and second cylinders in a closed loop flow of hydraulic fluid propelled from said first cylinder by said non-rotative first means into said second cylinder for converting said non-rotative fluid driven device into operating said second rotative shaft to produce torque output from said second cylinder; and d) electric motor means connected to said electrically operated hydraulic fluid pumping means for driving said rotary shaft in said first cylinder for exerting a linear directed pressure flow into said hydraulic driven device.

2. The hydraulic propulsion apparatus set forth in claim 1 wherein said electrically operated hydraulic fluid pumping device includes said non-rotative first means having two pair of helical grooves formed therein and said pumping device is a piston mounted on said shaft for movement in a linear direction to convert the body of hydraulic fluid in said cylinder into said linear directed fluid pressure.

3. The hydraulic propulsion apparatus set forth in claim 2 wherein said non-rotative piston mounted on said shaft is operably engaged in said helical grooves for movement in opposite direction for converting the linear directed body of hydraulic fluid in either direction of non-rotative piston movement.

4. The hydraulic propulsion apparatus set forth in claim 1 wherein said hydraulic power output device includes two pairs of helical grooves formed in said second rotary shaft and elements operably carried by said fluid driven device, said elements riding in said helical grooves to transmit rotation to said shaft from hydraulic pressure fluid supplied from said fluid pumping device into said second cylinder.

5. The hydraulic propulsion apparatus set forth in claim 1 wherein said conduit means interconnecting said first and second cylinder in a closed loop flow of hydraulic fluid includes a plurality of valve means having shuttle elements in each valve means, solenoid means connected to each of said valve means for independently moving said shuttle means in a predetermined sequence, and electrical circuit means connected to said solenoid means and being responsive to said non-rotative first means and said hydraulic fluid driven device for energizing said solenoid means to move said shuttle means to obtain said predetermined sequence in which said hydraulic fluid driven device is responsive to said non-rotative first means.

6. Hydraulic shaft propulsion apparatus comprising:
   a) a hydraulic fluid pumping cylinder having a helically grooved shaft carrying a hydraulic fluid pumping piston movable along the shaft in the cylinder;
   b) a battery powered electric motor connected to said spirally grooved shaft for rotating the shaft in one direction of rotation for moving said piston in opposite directions along said spirally groove shaft;
   c) a power output cylinder having a helically grooved shaft carrying a power delivery piston engaged on said shaft spiral grooves to power said grooved shaft; and
   d) hydraulic fluid flow directing means connected between said pumping cylinder and said power output cylinder, said flow directing means being operable to direct fluid in alternating direction between said cylinders.

7. The hydraulic vehicle shaft propulsion apparatus set forth in claim 6 wherein said pumping piston and said power delivery piston have piston areas in a ratio of six to one.

8. The apparatus set forth in claim 6 wherein said spirally grooved shaft and said pumping piston are rendered operable to move said piston back and forth in said cylinder along said shaft, and fluid flow control means on said pumping cylinder is operable to regulate the fluid flow into and out of said cylinder in response to movement of said piston.

9. A hydraulic fluid pressure powered driving apparatus comprising:
   a) a rotary power delivery shaft;
   b) two pairs of spiral grooves formed in said power shaft extending along said power shaft and terminating at ends formed with roll over channels;
   c) shaft driving piston means reciprocatable and operably mounted on said power delivery shaft to engage in said spiral grooves for rotating said power delivery shaft;
   d) hydraulic fluid pumping device for generating hydraulic fluid flow under pressure; and
   e) hydraulic fluid flow directing means connected to said fluid pumping device and said shaft driving piston means, said fluid flow directing means being operable to direct hydraulic fluid under pressure to reciprocate said shaft driving piston and effect rotation of said rotary power delivery shaft.

10. Electrohydraulic reciprocating piston apparatus for shaft drive, comprising in combination:
   a) a first hydraulic fluid containing cylinder having a rotary shaft mounted therein;
   b) a second hydraulic fluid containing cylinder having a rotary shaft mounted therein;
   c) a system of hydraulic fluid carrying conduits interconnecting said first and second cylinders for conducting hydraulic fluid between said cylinders;
   d) fluid flow controlling means in said system of hydraulic fluid carrying conduits for regulating the transfer of fluid between said cylinders;
   e) a first piston and a piston carrying shaft in said first cylinder;
   f) electric motor means connected to said first piston carrying shaft for driving said shaft to displace said piston to force hydraulic fluid to flow toward said control means and receive hydraulic fluid back from said control means;
   g) a second piston and a piston carrying shaft in said second cylinder responsive to hydraulic fluid received from said control means for displacing said piston on said shaft in said second cylinder; and
   h) means between said second piston and piston carrying shaft in said second cylinder operative to cause said piston carrying shaft to be driven upon piston displacement in response to hydraulic fluid received from said control means.

11. The apparatus set forth in claim 10 wherein said spirally grooved shaft and said pumping piston are rendered operable to move said piston back and forth in said cylinder along said shaft, and fluid flow control means on said pumping cylinder is operable to regulate the fluid flow into and out of said cylinder in response to movement of said piston.

12. Hydraulic fluid propulsion apparatus comprising:
   a) first and second closed cylinders interconnected in a closed hydraulic fluid flow loop;
   b) a first rotary shaft mounted in said first cylinder, said shaft having a first closed helix threaded grooves in said first shaft;
   c) a second rotary shaft mounted in said second cylinder, said shaft having a second closed helix threaded grooves in said second shaft;
   d) a hydraulic fluid pumping piston operatively carried on said first shaft for linear movement along said first shaft in said first closed helix threaded grooves;
   e) motor means connected to said first shaft to rotate said first shaft in a single predetermined direction of rotation to displace said pumping piston back and forth along said first closed helix threaded grooves in said first shaft;
   f) a hydraulic fluid flow displaced drive piston carried by said second shaft to drive said second shaft to deliver torque output from said second shaft to displace said drive piston back and forth along said second shaft;

g) an electro-hydraulic fluid flow control circuit operatively connected into said closed loop between said first and second closed cylinders, said control circuit including a fluid flow directing unit to regulate the flow of fluid pumped by said pumping piston toward said drive piston and the flow of fluid from said second cylinder to said first cylinder; and h) fluid flow determining valve means carried by said first and second closed cylinders in position to admit and discharge hydraulic fluid flow between said first and second closed cylinders to said electro-hydraulic fluid flow control circuit and said fluid flow determining valve means cooperating to transfer the back and forth fluid flow displacement by said fluid pumping piston to effect the fluid displaced drive piston for rotationally driving said second shaft.

* * * * *